United States Patent
Steiss et al.

(10) Patent No.: US 7,441,101 B1
(45) Date of Patent: Oct. 21, 2008

(54) THREAD-AWARE INSTRUCTION FETCHING IN A MULTITHREADED EMBEDDED PROCESSOR

(75) Inventors: Donald E. Steiss, Richardson, TX (US); Earl T Cohen, Fremont, CA (US); John J Williams, Jr., Pleasanton, CA (US)

(73) Assignee: Cisco Technology, Inc., San Jose, CA (US)

( * ) Notice: Subject to any disclaimer, the term of this patent is extended or adjusted under 35 U.S.C. 154(b) by 193 days.

(21) Appl. No.: 10/773,385

(22) Filed: Feb. 5, 2004

Related U.S. Application Data

(63) Continuation-in-part of application No. 10/733,153, filed on Dec. 10, 2003.

(51) Int. Cl.
G06F 9/312 (2006.01)
G06F 9/48 (2006.01)
(52) U.S. Cl. .................. 712/205; 712/219
(58) Field of Classification Search .............. 712/205, 712/219
See application file for complete search history.

(56) References Cited

U.S. PATENT DOCUMENTS

| | | | |
|---|---|---|---|
| 5,613,114 A | 3/1997 | Anderson et al. | |
| 5,724,586 A | 3/1998 | Edler et al. | |
| 5,742,822 A | 4/1998 | Motomura | |
| 5,771,382 A | 6/1998 | Wang et al. | |
| 5,799,188 A | 8/1998 | Manikundalam et al. | |
| 5,881,277 A * | 3/1999 | Bondi et al. | 712/239 |
| 5,907,702 A * | 5/1999 | Flynn et al. | 718/108 |
| 5,913,049 A | 6/1999 | Schiell et al. | |
| 5,991,792 A * | 11/1999 | Nageswaran | 718/102 |
| 6,016,542 A | 1/2000 | Gottlieb et al. | |
| 6,073,159 A | 6/2000 | Emer et al. | |
| 6,076,157 A * | 6/2000 | Borkenhagen et al. | 712/228 |
| 6,105,051 A | 8/2000 | Borkenhagen et al. | |
| 6,212,544 B1 | 4/2001 | Borkenhagen et al. | |
| 6,216,220 B1 | 4/2001 | Hwang | |
| 6,223,208 B1 | 4/2001 | Kiefer et al. | |
| 6,256,775 B1 | 7/2001 | Flynn | |
| 6,272,520 B1 | 8/2001 | Sharangpani et al. | |
| 6,292,888 B1 | 9/2001 | Nemirovsky et al. | |

(Continued)

OTHER PUBLICATIONS

Boothe, B. and Ranade, A. G., "Improved Multithreading Techniques for Hiding Communication Latency in Multiprocessors," ACM 1992, pp. 214-223.

(Continued)

*Primary Examiner*—Eric Coleman
(74) *Attorney, Agent, or Firm*—Tucker Ellis & West LLP

(57) ABSTRACT

The present invention provides a multithreaded processor, such as a network processor, that fetches instructions in a pipeline stage based on feedback signals from later stages. The multithreaded processor comprises a pipeline with an instruction unit in the early stage and an instruction queue, a thread interleaver, and an execution pipeline in the later stages. Feedback signals from the later stages cause the instruction unit to block fetching, immediately fetch, raise priority, or lower priority for a particular thread. The instruction queue generates a queue signal, on a per thread basis, responsive to a thread queue condition, etc., the thread interleaver generates an interleaver signal responsive to a thread condition, etc., and the execution pipeline generates an execution signal responsive to an execution stall, etc.

40 Claims, 13 Drawing Sheets

U.S. PATENT DOCUMENTS

| | | | |
|---|---|---|---|
| 6,308,261 | B1 | 10/2001 | Morris et al. |
| 6,341,347 | B1 | 1/2002 | Joy et al. |
| 6,353,881 | B1 | 3/2002 | Chaudhry et al. |
| 6,385,715 | B1 | 5/2002 | Merchant et al. |
| 6,411,982 | B2 | 6/2002 | Williams |
| 6,418,458 | B1 | 7/2002 | Maresco |
| 6,477,562 | B2 | 11/2002 | Nemirovsky et al. |
| 6,490,612 | B1 | 12/2002 | Jones et al. |
| 6,507,862 | B1 | 1/2003 | Joy et al. |
| 6,535,905 | B1 | 3/2003 | Kalafatis et al. |
| 6,542,920 | B1 | 4/2003 | Belkin et al. |
| 6,542,921 | B1 | 4/2003 | Sager |
| 6,542,987 | B1 | 4/2003 | Fischer et al. |
| 6,556,045 | B2 | 4/2003 | Cohen |
| 6,567,839 | B1 | 5/2003 | Borkenhagen et al. |
| 6,584,488 | B1 | 6/2003 | Brenner et al. |
| 6,594,755 | B1 | 7/2003 | Nuechterlein et al. |
| 6,785,890 | B2 * | 8/2004 | Kalafatis et al. ............ 718/108 |
| 6,792,446 | B2 * | 9/2004 | Merchant et al. ............ 718/108 |
| 6,889,319 | B1 * | 5/2005 | Rodgers et al. ............. 712/228 |
| 6,931,639 | B1 * | 8/2005 | Eickemeyer ................ 718/104 |
| 7,013,400 | B2 * | 3/2006 | Kalla et al. ................. 713/320 |
| 7,051,329 | B1 * | 5/2006 | Boggs et al. ................ 718/104 |
| 2001/0032307 | A1 | 10/2001 | Rohlman et al. |
| 2001/0056456 | A1 | 12/2001 | Cota-Robles |
| 2002/0010733 | A1 | 1/2002 | Baba et al. |
| 2002/0062435 | A1 | 5/2002 | Nemirovsky et al. |
| 2002/0087840 | A1 * | 7/2002 | Kottapalli et al. ........... 712/219 |
| 2003/0037228 | A1 * | 2/2003 | Kelsey et al. ............... 712/245 |
| 2003/0154235 | A1 | 8/2003 | Sager |
| 2003/0158885 | A1 | 8/2003 | Sager |
| 2003/0163589 | A1 * | 8/2003 | Bunce et al. ................ 709/250 |
| 2003/0163675 | A1 * | 8/2003 | Bennett et al. .............. 712/228 |

OTHER PUBLICATIONS

Gulati, M. and Bagherzadeh, N., "Performance Study of a Multithreaded Superscalar Microprocessor," 2nd International Symposium on High-Performance Computer Architecture, Feb. 1996, 11 pages.

Loikkanen, M. and Bagherzadeh, N., "A Fine-Grain Multithreading Superscalar Architecture," Proc. 1996 Confer. Parallel Architectures and Compilation Techniques, Oct. 1996, 6 pages.

Tullsen, D. M. et al., "Exploiting Choice: Instruction Fetch and Issue on an Implementable Simultaneous Multithreading Processor," Proc. Of the 23rd ISCA, May 1996, 12 pages.

Tullsen, D. M. et al., "Simultaneous Multithreading: Maximizing On-Chip Parallelism," Proc. Of the 22nd ISCA, Jun. 1995, 12 pages.

Yamamoto, W., "An Analysis of Multistreamed, Superscalar Processor Architectures," Ph.D. Thesis, U.C. Santa Barbara, Dec. 1995, pp. 1-155.

Regnier, G., et al., "ETA: Experience with an Intel® Xeon™ Processor as a Packet Processing Engine," IEEE Proceedings of the 11th Symposium on High Performance Interconnects, Aug. 20-22, 2003, pp. 76-82.

* cited by examiner

[ Priority / Availibility / Eligibility ]
610

| Time | $T_1$ | $T_2$ | $T_3$ | $T_4$ | Previous Selection |
|---|---|---|---|---|---|
| t | [0/1/1] | [0/0/0] | [1/1/1] | [0/1/0] | — |
| t+1 | [0/1/1] | [1/1/1] | [1/0/1] | [1/1/0] | $T_3^1$ |
| t+2 | [0/1/1] | [0/0/1] | [1/0/1] | [1/1/0] | $T_2^1$ |
| t+3 (global stall) | [0/0/0] | [0/1/0] | [1/0/1] | [1/1/0] | $T_1^1$ |
| t+4 | [0/0/0] | [1/1/1] | [1/1/1] | [1/1/1] | — |
| t+5 | [0/0/0] | [1/1/1] | [1/1/1] | [0/1/1] | $T_4^1$ |
| t+6 | [0/0/0] | [1/1/0] | [1/1/1] | [0/1/0] | $T_2^2$ |

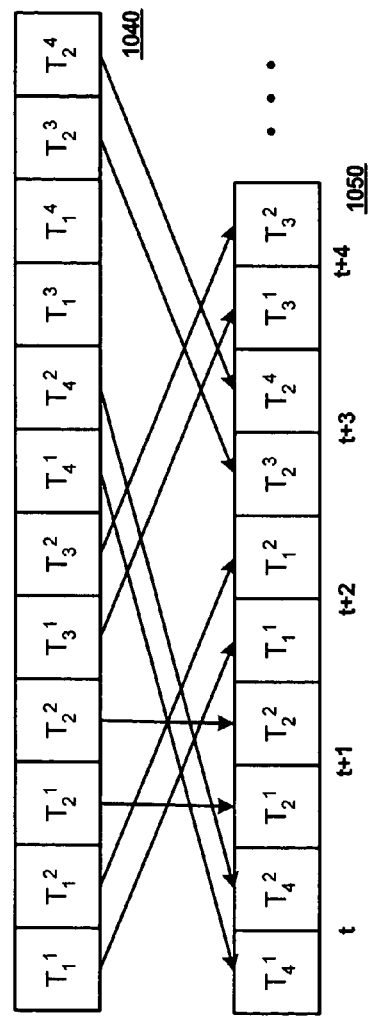
FIG. 10A
FIG. 10B

THREAD-AWARE INSTRUCTION FETCHING IN A MULTITHREADED EMBEDDED PROCESSOR

CROSS-REFERENCE TO RELATED APPLICATIONS

This is a continuation-in-part that claims priority under 35 U.S.C. § 120 to U.S. patent application Ser. No. 10/733,153, filed on Dec. 10, 2003, entitled "Thread Interleaving in a Multithreaded Embedded Processor," the contents of which are incorporated by reference herein in their entirety.

BACKGROUND OF THE INVENTION

1. Field of the Invention

This invention relates generally to computer processors and, more specifically, to a multithreaded network processor that fetches instructions for individual threads at a pipeline stage based on one or more feedback signals from later pipeline stages.

2. Background Art

Until recently, a lack of network bandwidth posed restraints on network performance. But emerging high bandwidth network technologies now operate at rates that expose limitations within conventional computer processors. Even high-end network devices using state of the art general purpose processors are unable to meet the demands of networks with data rates of 2.4-Gbps, 10-Gbps, 40-Gbps and higher. Network processors are a recent attempt to address the computational needs of network processing which, although limited to specialized functionalities, are also flexible enough to keep up with often changing network protocols and architecture. However, current network processors have failed to exploit certain characteristics of network processing by relying too much on general processing architectures and techniques.

Multithreading is a technique that improves the effective CPIs (Cycles Per Instruction) of a processor. Multithreading can be done at the software level or at the hardware level. In software-level multithreading, an application program uses a process, or a software thread, to stream instructions to a processor for execution. A multithreaded software application generates multiple software processes within the same application and a multithreaded operating system manages their dispatch, along with other processes, to the processor (compare with a multitasking software that manages single processes from multiple applications). By contrast, in hardware-level multithreading, a processor executes hardware instruction threads in a manner that is independent from the software threads. While single-threaded processors operate on a single thread at a time, multithreaded processors are capable of operating on instructions from different software processes at the same time. A thread dispatcher chooses a hardware thread to commence through the processor pipeline. "Multithreading" and "threads" as used herein, refer to hardware multithreading and hardware instruction threads, respectively.

One problem with conventional multithreading is that once an instruction thread is dispatched, any subsequent thread stalls at a pipeline stage introduce bubbles or unutilized cycles in an execution unit. A thread is dispatched at an instruction fetch stage by retrieving associated instructions from memory. The dispatched thread continues through the pipeline according to this instruction fetch sequence. Thread stalls can be due to data cache misses, interlocks, register dependencies, retries, or other conditions that cause an instruction to not be available for execution. Because instruction streams in a conventional scalar processor are locked in-order after dispatch, a subsequent instruction that is ready for execution in the execution unit must wait until the pipeline stall is cleared before resuming. Wasted cycles in the execution unit, regardless of overall clock speed, reduce effective processing clock speed with reduced throughput. In some instances, multithreading can result in reduced processor performance by increasing CPIs.

One approach to reducing the effects of pipeline latencies has been implemented in coarse-grained multithreaded systems. Coarse-grained multithreading runs instruction threads in blocks. Typically, user-interactive threads dominate the pipeline while background threads attempt to fill in utilization gaps. In other words, when a thread block experiences a high-latency event, a new thread is dispatched down the pipeline until the latency event is resolved, at which point, the original thread is reinstated. However, because there is also delay associated with dispatching the new thread in addition to reinstating the original thread, coarse-grained multithreading is not effective for frequent thread switching and low-latency events. Moreover, the switching latency grows proportionately with longer pipelines.

A related problem with conventional multithreading is that the instruction fetch stage dispatches instructions without regard to the state of later pipeline stages. As a result, a thread that executes efficiently depletes its dispatched instructions while a thread that does not execute efficiently overflows with instructions. If the instruction fetch stage is servicing a large amount of threads, there can be an unacceptable lag time before further instructions are dispatched for the offending thread. Moreover, when a thread experiences a branch misprediction, its associated instructions are invalidated or flushed. When fetching variable length instructions with a fixed frame size, the instruction fetch is not aware of the actual number of returned instructions. For instructions varying between one and three bits that are retrieved using a fixed 4-byte frame, there can be anywhere from one to four resulting instructions for a thread. However, the instruction fetch stage has no way of adjusting current and/or future fetch decisions to account for this result.

Therefore, what is needed is a multithreaded processor capable of fetching instructions for multiple threads based on the state of individual threads in later pipeline stages.

SUMMARY OF THE INVENTION

The present invention meets these needs by providing a processor that fetches instructions in response to per thread feedback signals from one or more later pipeline stage. In one embodiment, the multithreaded processor comprises a pipeline with an instruction unit in a pipeline stage and an instruction queue in a subsequent stage. A signal line, coupled from an output of the instruction unit to a first input of the instruction queue, sends signals representing fetched instructions. A feedback signal line, coupled from an output of the instruction queue to an input of the instruction unit, sends a queue signal. The instruction queue stores decoded instructions and generates the queue signal to represent, for example, queue depths, available thread queue positions, or other instruction conditions, for each thread. One embodiment of the instruction unit further comprises a fetch control unit having an output coupled to an input of an instruction cache. The fetch control unit generates an instruction fetch sequence based on the queue signal and/or other inputs. The instruction cache dispatches instruction data through its output, which forms the output of the instruction unit.

In another embodiment, the multithreaded processor further comprises a thread interleaver having an input coupled by a signal line to a second output of the instruction queue. Another feedback signal line, coupled from a first output of the thread interleaver to the input of the instruction unit, sends an interleaver signal. The thread interleaver determines a thread execution sequence independent of the instruction fetch sequence and generates the interleaver signal to represent, for example, which threads are ineligible for execution, or other thread conditions. The instruction unit fetches instructions for the multiple threads based on the interleaver signal.

In yet another embodiment, the multithreaded processor further comprises an execution pipeline. Yet another feedback signal line, coupled from an output of the execution pipeline to the input of the instruction unit, sends an execution signal. The execution pipeline executes instructions as selected by the thread interleaver and generates the execution signal responsive to branch mispredictions, exceptions, and other thread conditions on a per thread basis.

In a second embodiment of the instruction unit, the fetch control unit defaults to round robin selection between threads to generate the instruction fetch sequence when threads have no or similar input signals. But in response to input signals, the fetch control unit can block fetching, immediately fetch, raise priority, or lower priority for a particular thread. In one example, the fetch control blocks or otherwise delays fetching responsive to the queue signal indicating that there are no instruction storage positions available for that thread. In another example, the fetch control unit advances the thread (or raises urgency) or immediately fetches instructions for a thread that has recently experienced a branch misprediction or exception.

BRIEF DESCRIPTION OF THE FIGURES

FIGS. 6A-C illustrate two-level round robin arbitration in the thread interleaver according to an embodiment of the present invention.

FIGS. 10A-B illustrates an example of the instruction fetch sequence as a result of example feedback signals according to one embodiment of the present invention.

DETAILED DESCRIPTIONS OF THE PREFERRED EMBODIMENTS

I. Introduction

The present invention meets these needs by providing a processor that fetches instructions in response to per thread feedback signals from one or more later pipeline stage. Many variations will be apparent to one of ordinary skill in the art that would yet be encompassed by the spirit and scope of the invention. For example, one of ordinary skill will recognize that aspects of the invention described with respect to a single processor are also applicable to a multiple processors having multiple pipelines. Additionally, although the present invention provides optimum performance to a network processor, it may be implemented in any environment such as in supercomputers, personal computers, digital signal processors, workstations, PDAs (Personal Digital Assistants), and the like. Moreover, couplings to inputs and outputs are examples of structure that are variable according to design choice within the scope of the present invention. Accordingly, the below description is included to illustrate the operation of the preferred embodiments and is not meant to limit the scope of the invention. Rather, the scope of the invention is to be limited only by the claims that follow.

II. Network Processing System

Figure 1:
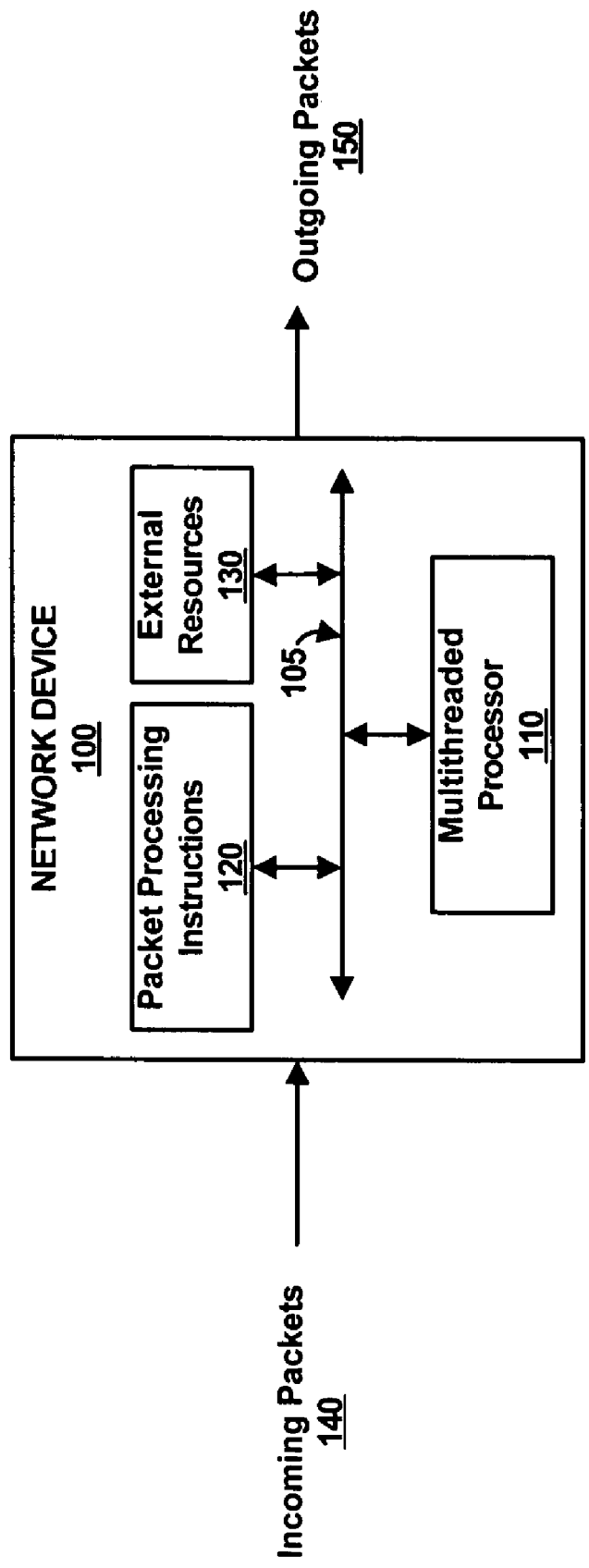
FIG. 1 is a block diagram illustrating a network processing system according to one embodiment of the present invention.

FIG. 1 is a block diagram illustrating a network processing system 100 according to one embodiment of the present invention. The system 100 comprises a multithreaded processor 110, packet processing instructions 120, and external resources 130 coupled by a bus 105. The system 100 may be a specialized computing device such as a router, a switch, a bridge, a gateway, or a combination of devices such as the 12000-series systems manufactured and sold by Cisco Systems, Inc. of Sunnyvale, Calif. The system 100 processes incoming packets 140 received from a network resulting in outgoing packets 150 sent through the network. More specifically, multithreaded processor 110 executes the packet processing instructions 120 with the help of external resources 130 to perform various tasks such as routing, switching, bridging, and packet forwarding using various network protocols such as TCP/IP (Transmission Control Protocol/Internet Protocol), ATM (Asynchronous Transfer Mode), IEEE 802.3, IEEE 802.11, etc. The system 100 operates to service high-speed networks with bandwidths of 2.4-Gbps, 10-Gbs, 40-Gbps and above.

The packet processing instructions 120 comprise a set of instructions, packet processing extensions, or software code that is executed by the multithreaded processor 110. Examples of packet processing extensions include bit field manipulation instructions, checksum acceleration instructions, and encryption instructions. In one embodiment, at least some instructions include an external priority set by a programmer or other software. The external priority influences thread interleave decisions as described below. In one embodiment, an operating system such as VxWorks by WindRiver of Alameda, Calif. or other controlling software manages instruction flow to the multithreaded processor 110.

The external resources 130 provide co-processing and/or other helper capabilities to the multithreaded processor 110. For example, a CAM (Content Addressable Memory) device provides ACL (Access Control List) look-ups, a search engine provides packet forwarding translations, and a buffer stores the incoming and outgoing network packets 140, 150. Additional memory elements such as SRAM (Static Random Access Memory) or EEPROM (Electronically Erasable Programmable Read Only Memory) store packet processing instructions 120. Use of external resources 130 by the multithreaded processor 110 can cause external resource stalls to a thread as described below.

The multithreaded processor 110 processes instructions from the packet processing application 120 with fine-grained thread interleaving sequentially proximate to execution. The multithreaded processor 110 processes multiple instruction threads, $T_m^k$, where, for example, m=2, 4, 128 or more multiple threads and k=the $k^{th}$ instruction from thread m. Additionally, the multithreaded processor 110 can contain in its pipeline, more than one instruction from the same thread at the same time. The multithreaded processor 110 comprises, for example, a network processor, a general processing unit, a multiple instruction multiple data processor, an x86-type processor, an application specific integrated circuit, or the like. The multithreaded processor 110 is implementable as an integrated circuit on substrates such as silicon or geranium, a field programmable device, a nanotechnology-based chip, or any other device and/or software combination for implementing logic functionality at high data rates. In one embodiment, the multithreaded processor 110 is implemented as described with reference to FIGS. 2-4 performing methods as described with reference to FIGS. 5-6.

III. Multithreaded Processor

Figure 2:
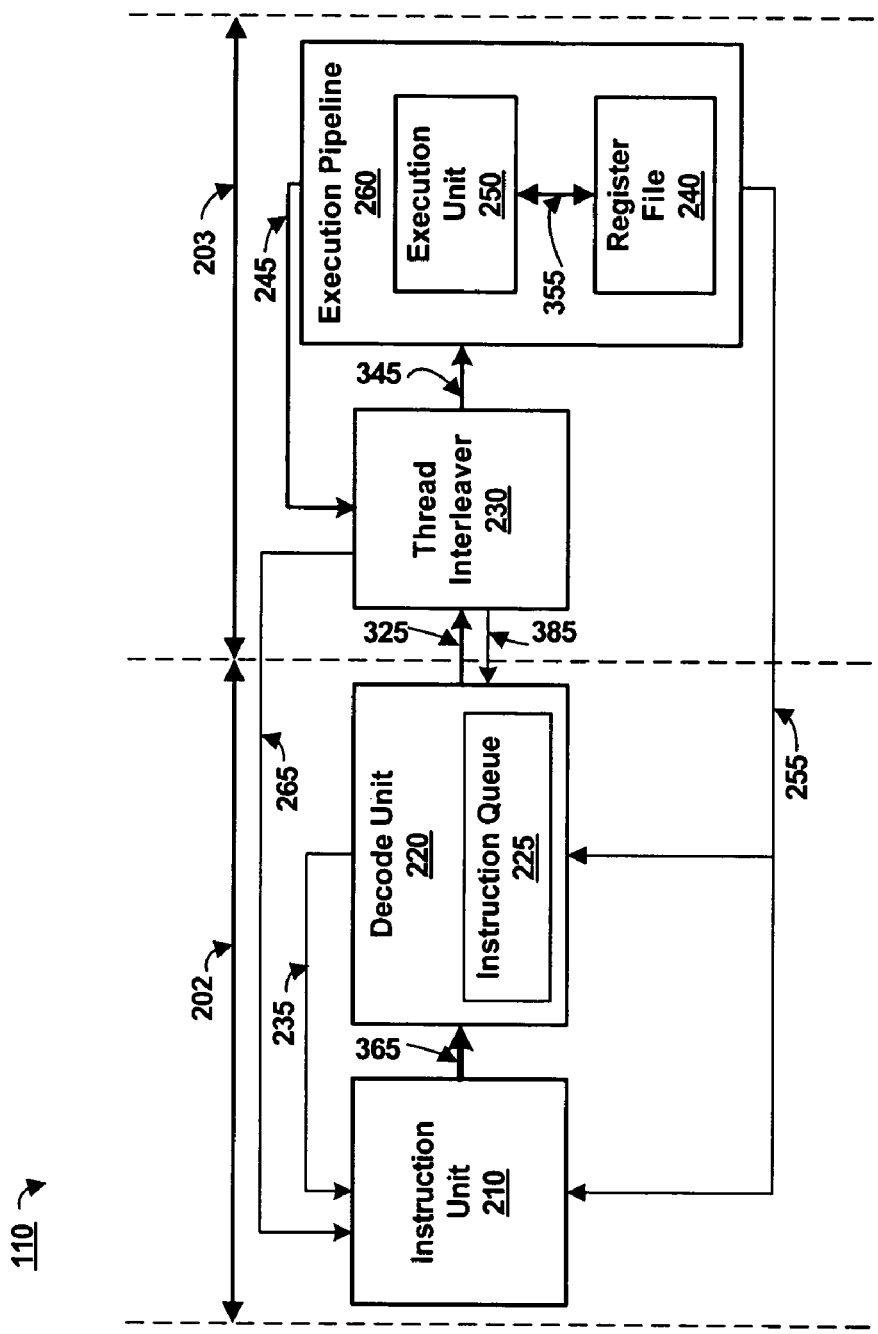
FIG. 2 is a block diagram illustrating the multithreaded processor according to one embodiment of the present invention.

FIG. 2 is a block diagram illustrating the multithreaded processor 110 according to one embodiment of the present invention. The multithreaded processor 110 comprises an upper pipeline 202 having an output that is coupled by a signal line 325 (or decoded instruction bus) to an input of a lower pipeline 203, both the upper pipeline 202 and the lower pipeline 203 having pipeline stages. Generally, pipeline stages represent a particular functionality optimized for performance in synchronization with a system clock (not shown). A pipeline stage, or portions of the functionality therein, may be implemented by hardware and/or software. Preferably, each pipeline stage performs its function within a clock cycle. However, at the level of abstraction of FIG. 2, the pipeline stages may use more or less than a single clock cycle. Additionally, the pipeline stages are merely illustrative. One of ordinary skill in the art will recognize that the upper and lower pipelines 202, 203 together may vary from fewer than four to more than twelve pipeline stages, and still fall within the scope of the present invention.

The upper pipeline 202 comprises an instruction unit 210 coupled by a signal line 365 to a decode unit 220 that further comprises an instruction queue 225. The input of the instruction unit 210 forms the input of the upper pipeline 202. The output of the instruction queue 225 forms the output of the decode unit 220 and the upper pipeline 202. In the upper pipeline 202, the instruction unit 210 determines an instruction fetch sequence according to an instruction fetch algorithm. The instruction fetch algorithm organizes instructions fetches from instruction caches and off-chip memory for dispatch. Typically, several instructions for a single thread are fetched together, which may not be optimal for execution.

The lower pipeline 203 comprises a thread interleaver 230 coupled by a signal line 345 to an execution pipeline 260. The execution pipeline 260 further comprises an execution unit 250 coupled by a signal line 355 to a register file 240. An input of the thread interleaver 230 forms the input of the lower pipeline 203. In the lower pipeline 203, a first embodiment of the thread interleaver 230 determines a thread execution sequence independent of the instruction fetch sequence. The instruction fetch sequence is thus capable of being resequenced relative to the thread execution sequence as shown and discussed below with reference to FIG. 6C. The thread execution sequence (or thread interleave sequence) organizes instructions sent to the execution unit 250 in an order that is optimized for high utilization of the multithreaded processor 110. Example instruction fetch sequences and thread execution sequences are illustrated and discussed below with reference to FIG. 6B.

The instruction unit 210 fetches and outputs instructions on a per thread basis. An instruction comprises, for example, a 16-bit, 32-bit, 64-bit ISA (Instruction Set Architecture) instruction, a VLIW (Very Long Instruction Word) instruction, or the like. The instruction unit 210 retrieves instructions according to the instruction fetch algorithm, which in one embodiment comprises bursts of several cycles on a round-robin basis. Inactive threads can be removed from the instruction fetching arbitration according to, for example, bits in an active thread register.

In one embodiment, the instruction unit 210 is split into two pipeline stages so that instruction cache accesses are not part of a clock-limiting logic path. In another embodiment, the on-chip instruction hierarchy comprises a local instruction cache exclusive to a single execution unit, a cluster instruction cache shared by several neighboring execution units, and a global instruction cache shared by several clusters. Resorting to off-chip resources such as RAM, or even more, disk drives, requires significantly more clock cycles resulting in longer thread stalls. In another embodiment, the processor-level performance consequences of these cases of thread stalls are lessened through the use of nonblocking cache instruction cache architecture.

In still another embodiment, the instruction unit 210 has an input to receive a feedback signal on signal line 235 from the decode unit 220 indicating, e.g., queue depths of the instruction queue 225 on a per thread basis. Also, the instruction unit 210 has an input to receive a feedback signal on signal line 255 from the execution unit 250 indicating, e.g., branch mispredictions. Additionally, the instruction unit 210 has an input to receive a feedback signal on line 265 from the thread interleaver 230 indicating, e.g., ineligible threads. Future instruction fetching and output decisions address, e.g., the lowest queue depth, maintaining minimum queue depths for each thread, whether or not a thread is eligible for execution and/or pipeline flushes as described below. Preferably, the instruction unit 210 is optimized for a packet processing instruction set 120.

The decode unit 220 translates instructions into microcode, suitable for the execution unit 250. The microcode comprises, for example, RISC (Reduced Instruction Set Computing) or CISC (Complex Instruction Set Computing) type microinstructions, micro-ops, or the like. In a preferred embodiment, while the instructions can be variable length instructions, the number of bytes fetched during an instruction fetch is fixed (e.g., 4 bytes). Thus, the actual number of instructions fetched is not known until they are decoded. Decoded instructions are eventually output to the thread interleaver 230.

In one embodiment, the decode unit 220 also comprises a predecode unit (not shown) as a separate pipeline stage. The predecode unit identifies instruction boundaries for variable length instructions, decodes control transfers, and decodes instruction formats. Also, the decode unit 220 is coupled to receive a signal on line 285 indicative of a thread selected by the thread interleaver 230, and a signal on line 255 from the execution pipeline 260 indicative of, for example, a branch misprediction or other event resulting in instruction invalidation and/or instruction flushing.

The decode unit 220 further comprises an instruction queue 225 to store decoded instructions, thereby decoupling the upper and lower pipelines 202, 203. Decoded instructions are received into the instruction queue 225 according to the instruction fetch sequence, but are sent according to the thread execution sequence. The instruction queue 225 comprises, for example, a pointer based FIFO with a 2-write, 1-read, 8-deep queue per thread. An entry is, for example, 101 bits and is comprised of an instruction, a program counter, an absolute register address, and pre-decoded controls for the thread interleaver 230. In one embodiment, the instruction queue 225 stores a fixed number of pre-decoded instructions. In another embodiment, the instruction queue 225 stores a fixed number of bytes of pre-decoded instructions. The instruction queue 225 is described in further detail below with reference to FIG. 8.

The thread interleaver 230 interleaves decoded instructions from different threads responsive to thread conditions. Indications of decoded instructions received in a sequence as dispatched from the decode unit 220 populate a pool of available threads. A thread condition signal on signal line 245 feeds back thread conditions from the execution unit to the thread interleaver 230. Thread conditions such as data cache misses and other conditions described below, and instruction conditions determine the resequencing of instructions dispatched from the thread interleaver 230. The resulting thread execution sequence is thus optimized to reduce future threads stalls with a fine-grained thread dispatch disposed proximate to the execution unit 250. The thread interleaver 230 and related methods are described in more detail below.

The execution unit 250 executes decoded instructions. The execution unit 250 comprises, for example, a processing core, a parallel processing element, an ALU (Arithmetic/Logical Unit), an FPU (Floating Point Unit), or the like. The execution unit 250 further comprises a plurality of registers and buffers. Preferably, each thread has at least some dedicated registers in the register file 240 for low overhead context switching. The execution unit 250 can execute a different thread each cycle. In response to an execution stall by a thread, the execution unit 250 activates signal line 245 indicating the stalled thread, other conditions associated with the thread, and thread conditions associated with other threads in the multithreaded processor 110.

The register file 240 includes associated control logic that manages execution registers using an architecture register file (not shown). The architectural register file includes, for example, four copies of 32×32 register files for each thread. The architecture register file comprises flip-flops, latches with precharged bit lines, or the like. The register file maintains a state for each thread, or context. The register file 240 converts register names to physical register addresses and manages register interlocks. In addition, the register file 240 also includes the logic for a datapath to produce the operands. In one embodiment of the register file 240, it only maintains a cache of threads states for threads eligible for execution.

In one embodiment, an execution pipeline 260 comprises the register file 240 and the execution unit 250. The execution pipeline 260 is, in one embodiment, coupled directly to the thread interleaver 230 to receive the thread execution sequence. Because the execution pipeline 260 immediately follows thread interleaving, instructions can be executed within a few cycles after sequencing. Advantageously, the execution unit 250 receives instructions sequenced on comparatively recent thread conditions. The execution pipeline 260 also generates an execution signal 255 responsive to, for example, a branch misprediction or exception during execution.

In an alternate embodiment, a plurality of execution units 250 each receives microcode from an associated multithreaded pipeline. The execution units 250 are organized by clusters and share resources at the cluster level or global level.

Figure 7:
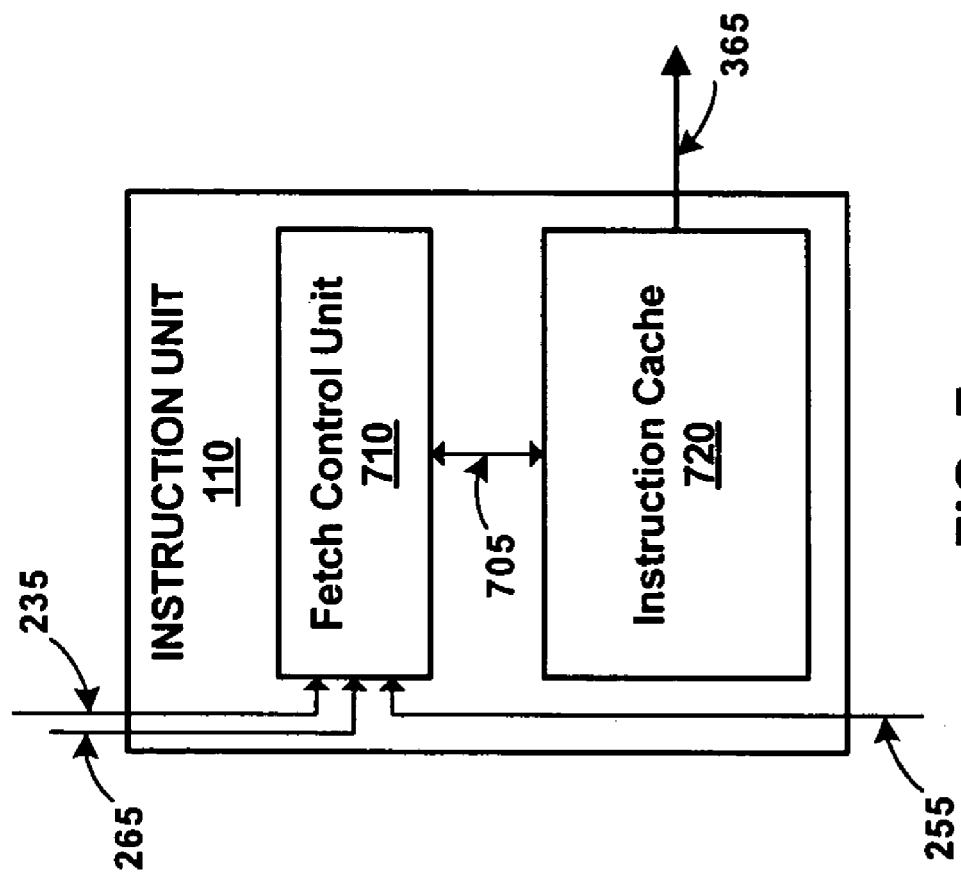
FIG. 7 is a block diagram illustrating the instruction unit according to one embodiment of the present invention.

FIG. 7 is a block diagram illustrating the instruction unit 120 according to one embodiment of the present invention. The instruction unit 120 comprises a fetch control unit 710 and an instruction cache 720. Signal lines 235, 265, 255 are coupled to an input of the fetch control unit 710 forming one or more inputs to the instruction unit 120 to send queue, interleaver, and execution feedback signals from later pipeline stages. Signal line 705 couples an input/output of the fetch control unit 710 to an input/output of the instruction cache 720 to send information related to instruction fetch decisions. Signal line 365 is coupled to an output of the instruction cache 720 forming an output of the instruction unit 110 to send instruction data. In one embodiment, signal lines 235, 265, 255 are buses with a line for each thread.

In general, the fetch control unit 710 determines an instruction fetch sequence that is dispatched by the instruction cache 720. More specifically, the fetch control unit 710 determines the instruction fetch sequence based on various inputs from later pipeline stages. In the embodiment of FIG. 7, signal lines 235, 265, 255 feedback information related to the instruction decode, thread interleaving, and the execution pipeline stages respectively. In response to the feedback signals, the fetch control unit 710 can block fetching, immediately fetch, advance fetching (or raise urgency), or delay fetching (or lower urgency) for a thread responsive to feedback signals.

In one embodiment, the fetch control unit 710 blocks fetching responsive to the queue signal indicating that there are no instruction storage positions available for the thread. In another embodiment, the fetch control unit 710 advances a thread or immediately fetches instructions for a thread that has recently experienced a branch misprediction or exception as indicated by the execution signal. In yet another embodiment, the fetch control unit 710 delays an instruction fetch of an ineligible thread or raises the priority of a thread having priority as indicated by the interleaver signal. One of ordinary skill in the art will recognize variations of feedback signals and varying combinations of feedback signals within the scope of the present invention. Because feedback signals provide information about a thread's use of instructions after dispatch from the instruction unit 120, the fetch control unit 710 is able to optimize bandwidth use by optimizing current and future fetch decisions. The fetch control unit 710 and related methods are discussed in further detail below.

The instruction cache 720 stores and dispatches instructions as determined by the fetch control unit 710. In one implementation, the instruction cache 720 is 16 kB and 8-way banked with 16 cache sets per bank. Instruction cache 720 accesses can be spread out over two pipeline stages so that it is not in the critical path. If the requested instruction is not stored in the instruction cache 720, the request may be sent to higher level memory such as a level-2 instruction cache, a shared on-chip instruction memory, an off-chip RAM or ROM module, and the like.

Figure 8:
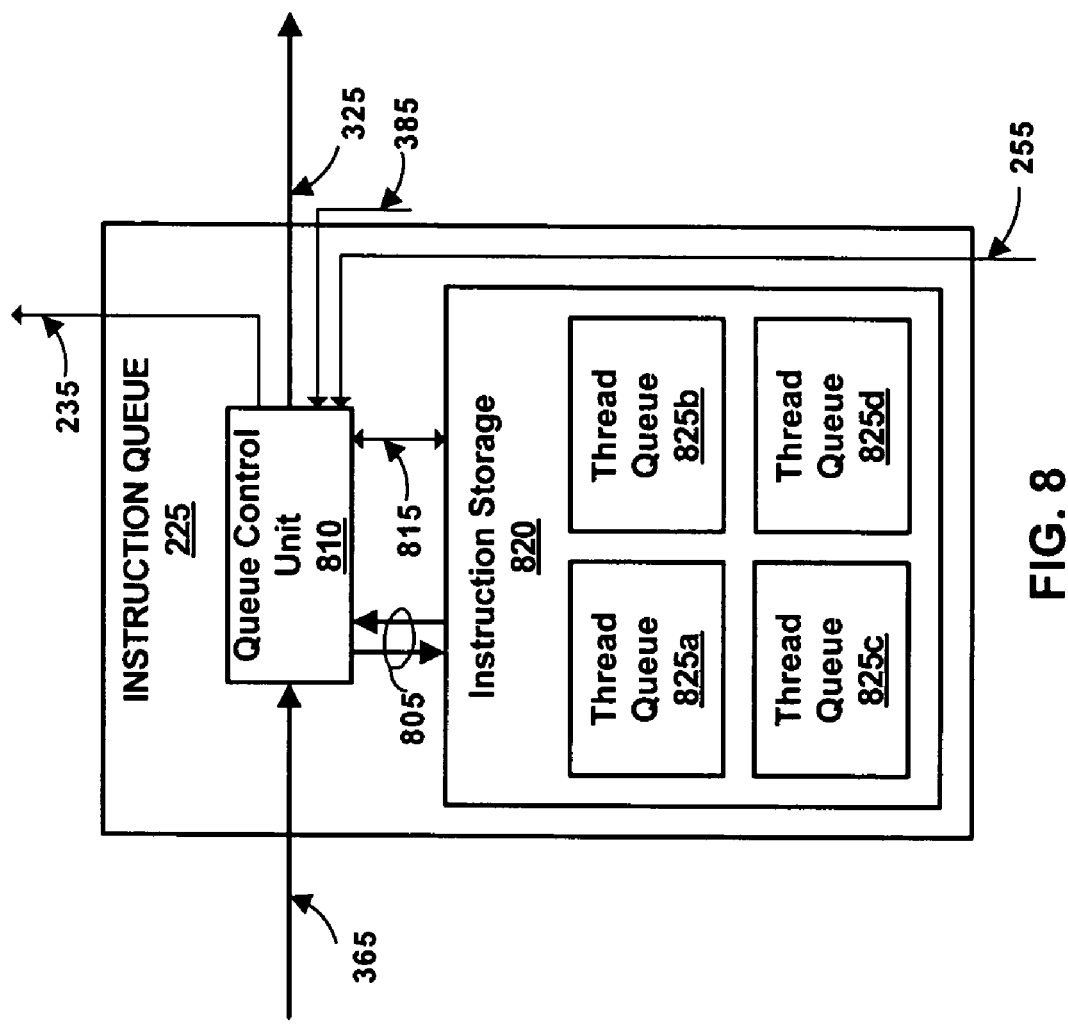
FIG. 8 is a block diagram illustrating the instruction queue according to one embodiment of the present invention.

FIG. 8 is a block diagram illustrating the instruction queue 225 according to one embodiment of the present invention. The instruction queue 225 comprises a queue control unit 810 and an instruction storage 820 having individual thread queues 825*a-d*. Note that while FIG. 8 shows four thread queues 825, any number of thread queues 825 can be included in the instruction storage 820 (e.g., same as number of threads). For example, in one embodiment, the number of instruction queues 825 can be reduced from the number of threads, to the number of eligible threads for better efficiency.

Signal lines 365, coupled to an input of the queue control unit 810, sends decoded instructions for storage via the decode unit (not shown in FIG. 8) in a thread queue 825, while signal line 325, coupled to an input/output, sends decoded instructions as selected by the thread interleaver 230. Signal line 325 also sends instruction conditions such as availability, age, or priority indications, and signal line 385, also coupled to the input/output, receives queue advance signals responsive to a selected instruction. Signal lines 805 are coupled to an input/output of the queue control unit 810 and an input/output of the instruction storage 820 to send and retrieve instruction data. Signal line 255 is coupled to a second input of the queue control unit 810 to send an execution signal from the execution pipeline 260. Signal line 815 is coupled to the input/output of the queue control unit 810 and the input/output of the instruction storage 820 to send control information related to the thread queues 825a-d such as depth of thread queues 825a-d. Signal line 235 is coupled to a second output of the queue control unit 810 to send a queue signal.

The queue control unit 810 organizes instructions for storage in thread queues 825a-d on a per thread basis. The queue control unit 810 sends an indication of queue depths, an indication of thread queue 825 availability and/or related information to the instruction unit 210 via line 235 on a per thread basis. In one embodiment, the queue control unit 810 sends an indication that a thread queue 825 has less than a certain number of available instruction storage positions. In yet another embodiment, the queue control unit 810 sends an indication that a thread queue 825 has less than a certain number of instructions available (i.e., valid) to a thread. The queue control unit 810 flushes a thread queue 825 corresponding to threads experiencing a branch misprediction or exception.

The thread queues 825a-d store instructions for a particular thread. The thread queues 825a-d store and transmit instructions for them as indicated by, for example, thread identification bits associated with the instruction. According to the implementation, the thread queues 825a-d can be separate physical devices or a single device such as an SRAM. The thread queues 825a-d are preferably FIFO memory units that store instructions in order of arrival. In one implementation, the thread queues 825a-d comprise 2-write, 1-read, 8-deep storage with 101-bit width.

Figure 3:
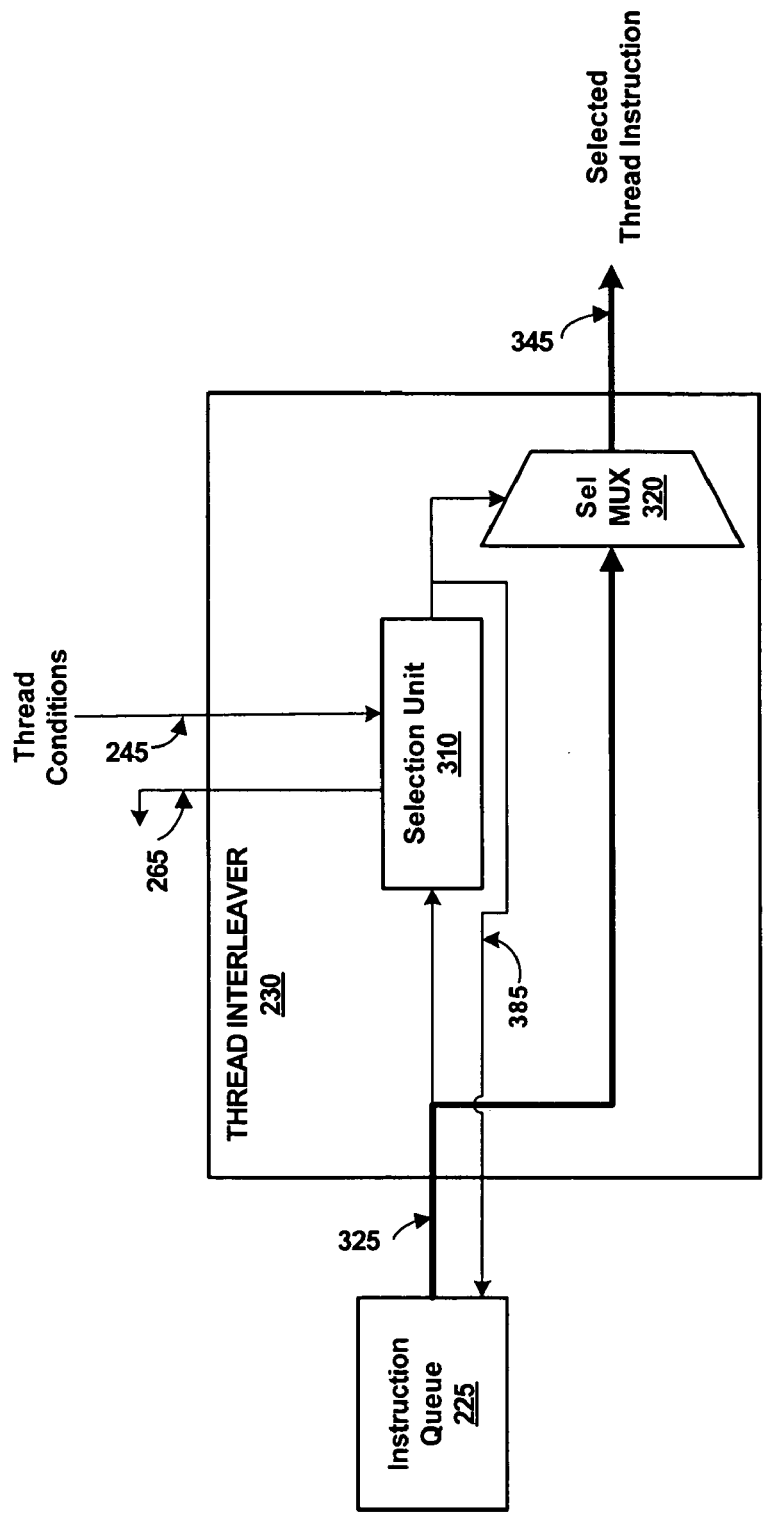
FIG. 3 is a block diagram illustrating the thread interleaver according to one embodiment of the present invention.

FIG. 3 is a block diagram illustrating the thread interleaver 230 according to one embodiment of the present invention. The thread interleaver 230 can be implemented in hardware, software, or a combination of both. The thread interleaver 230 comprises a selection unit 310 and a selection multiplexer ("mux") 320. The selection unit 310 comprises an input to receive an instruction conditions signal from signal line 325 and an output to send a thread selection signal to the selection mux 320 and the instruction queue 225 via signal line 385. The selection mux 320 has one or more data inputs coupled to line 325 to receive decoded instructions from the instruction queue 225, a control input coupled to signal line 355 to receive thread conditions and an output coupled to signal line 345 to send decoded instruction selections from the thread interleaver 230.

The selection unit 310 selects threads using two-level round robin arbitration. The selection unit 310 is, for example, an arbiter or other logic configured to make selections for output based on input conditions. Accordingly, round robin occurs in the selection unit 310 in two different phases. In one embodiment, round robin occurs between threads with instructions at a high priority level and between instructions at a low priority level. Within a priority level, a thread that is next in line following a previously selected thread has an opportunity to win arbitration. If the next in line thread is ineligible, or is associated with an unavailable instruction, a thread that is second in line has an opportunity to win arbitration. One embodiment of round robin dispatches an oldest or head of queue thread each clock cycle.

The primary thread conditions associated with each thread include execution stalls indicative of thread latencies. Execution stalls include data cache misses, external resource stalls (e.g., from 130), TLB (Translation Lookaside Buffer) misses, intra-thread register interlocks, dependencies, retries, global stalls, main memory misses, L1 or L2 data cache misses, memory operation ordering such as write buffer state, and other latencies of a particular thread. Other thread conditions include global stalls, write buffer capacity interlocks, multi-cycle cache control operations, test operations, misaligned access stalls, sleep timers, etc. Instruction conditions include instruction availability, external programmer priority, order of arrival at the instruction queue 225, etc.

In a conventional prior art processor a thread stall locks up the execution unit 250 for one to four or more clock cycles as an instruction or data request travels through a hierarchy of resources. Each hierarchy level is likely to operate under clock frequencies inferior to the execution unit 250. In contrast, the present invention uses previous stalls as a condition to current and future thread selections, thus thread stalls such as a high latency cache miss have the opportunity to be resolved. Consequentially, the thread interleaver 230 can advantageously output a decoded instruction to the execution unit 250 that is resequenced with respect to order of fetching. The thread interleaver 230 and related methods are described in more detail below.

The selection mux 320 outputs the decoded instruction according to the thread that wins two-level round robin arbitration as indicated by the output of control mux 440. The instruction output is preferably at the head of queue or the oldest of instructions amongst the instructions associated with the selected thread. In another embodiment, instructions are output out-of-order within the selected thread.

Figure 4:
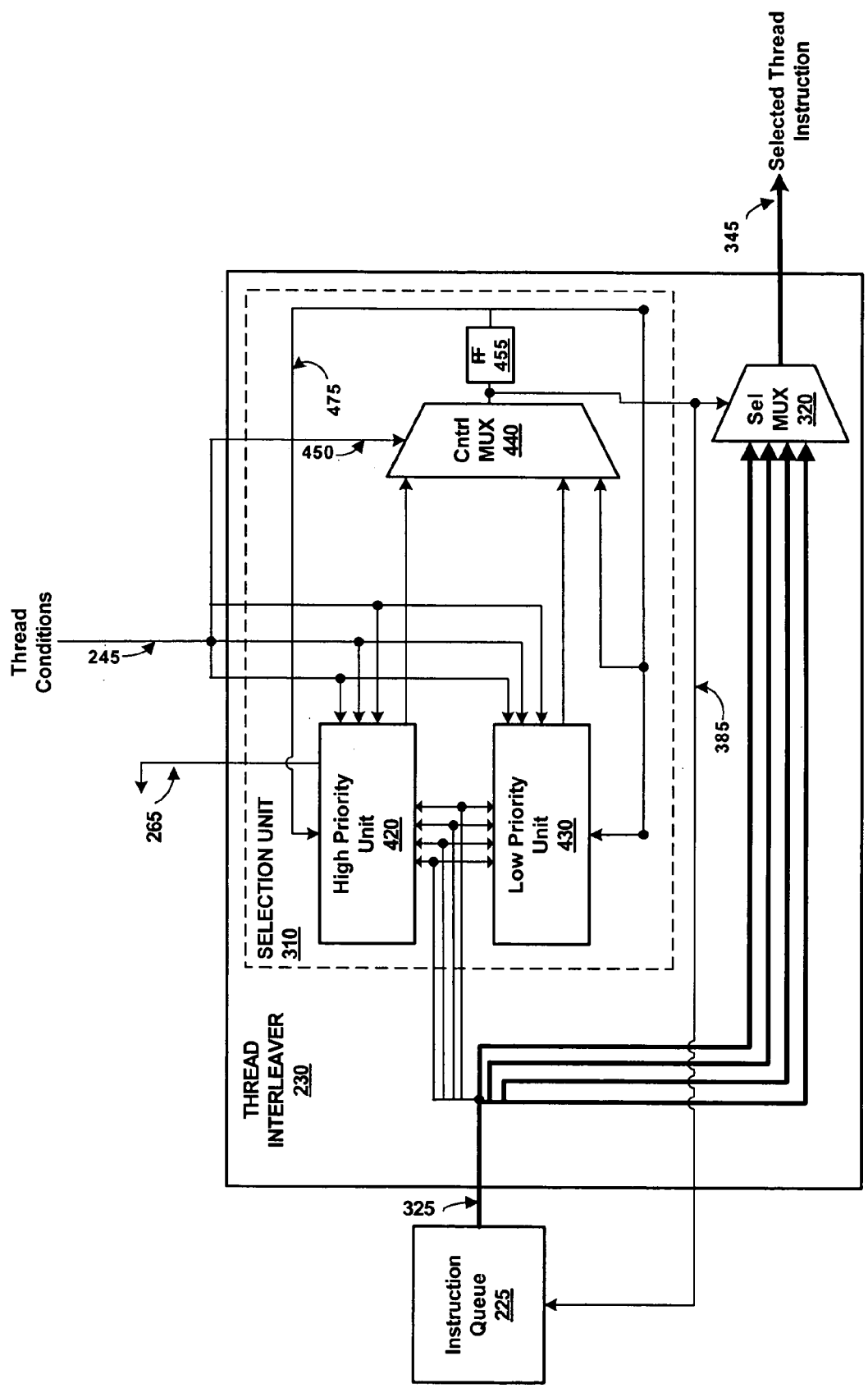
FIG. 4 is a block diagram illustrating the selection unit according to one embodiment of the present invention.

FIG. 4 is a block diagram illustrating the thread interleaver 230 according to a second embodiment of the present invention. The selection unit 310 further comprises a high priority unit 420, a low priority unit 430, and a control mux 440. Inputs of the high and low priority units 420, 430 receive thread conditions via signal line 245. One or more bits or bit vectors represent data on signal line 245 as shown in FIG. 6A. Both the high priority unit 420 and the low priority unit 430 are coupled to receive the instruction conditions from signal line 325. The signal line 325 can also be a plurality of signal lines associated with a head of queue instruction from different threads. The instruction conditions include an external priority, and a state of each head of queue instruction, among other things. External priority can be set by a programmer or automatically by a program for code optimizations, by the packet processing application 120 during critical periods, by the instruction unit 210 responsive to branch mispredictions, or the like. Outputs of the high and low priority units 420, 430 are coupled to the control mux 440 to send their selections. An output of control mux 440 is coupled to an input of the selection mux 320 and the instruction queue 225 to send an indication of the selected thread through signal line 385.

The high priority unit 420 selects between the high priority thread pool based on various thread conditions. In the embodiment of FIG. 4, the high priority unit 420 is coupled to signal lines to receive three thread conditions for one or more threads from signal line 245. In one embodiment, the high priority unit 420 receives thread conditions for individual threads from signal lines. Flip flop 455 is coupled to signal line 475 to indicate a thread selected during a previous clock cycle. The last selection can be stored in a flip flop 455 or other memory element. In a default round robin arbitration mode where the high priority unit 420 selects the oldest thread instruction, the previous selection becomes the youngest thread instruction. The thread condition can be represented by a set of n bits or a bit vector indicating the particular thread or threads out of n threads (e.g., [n−1:0]) that has stalled. The priority signal may comprise a set of bits similar to the thread stall condition. The global stall signal is active during, for example, an interrupt or other stall independent of a condition related to a particular thread.

The low priority unit 430 preferably receives the same thread condition inputs as the high priority unit 420, and is thus coupled to signal line 245. The previous selection is input to the low priority unit 430 via signal line 475. In one embodiment, if the last thread selection differs from the one selected by the low priority unit 420, the next selection remains the same. Example thread conditions are shown in FIG. 6A.

The control mux 440 chooses between the selection of the high priority unit 420 and the low priority unit 430. The default arbitration is to pass through the high priority selection, and when there is none, to pass through the low priority selection. In one embodiment, after a maximum number of consecutive high priority selections, a low priority selection is output notwithstanding available high priority selections. In another embodiment, the control mux 440 is coupled to signal line 450 to receive a late stall signal from the register file 240 or execution unit 250. Late stalls, decoded by register file 240 and/or the execution unit 250, indicate, for example, register interlocks and misaligned access stalls. The late stall signal on signal line 450 indicates an offending thread with a set of bits. If the offending thread is a thread to be output from the selection mux 440, an ultimate selection can be changed. For example, an instruction from the high priority unit 420 that is ordinarily passed through the selection mux 440 is replaced by an instruction from the low priority unit 430 output if a preceding instruction associated with the same thread as the high priority selection caused a late stall.

IV. Instruction Fetch Sequence

Figure 9:
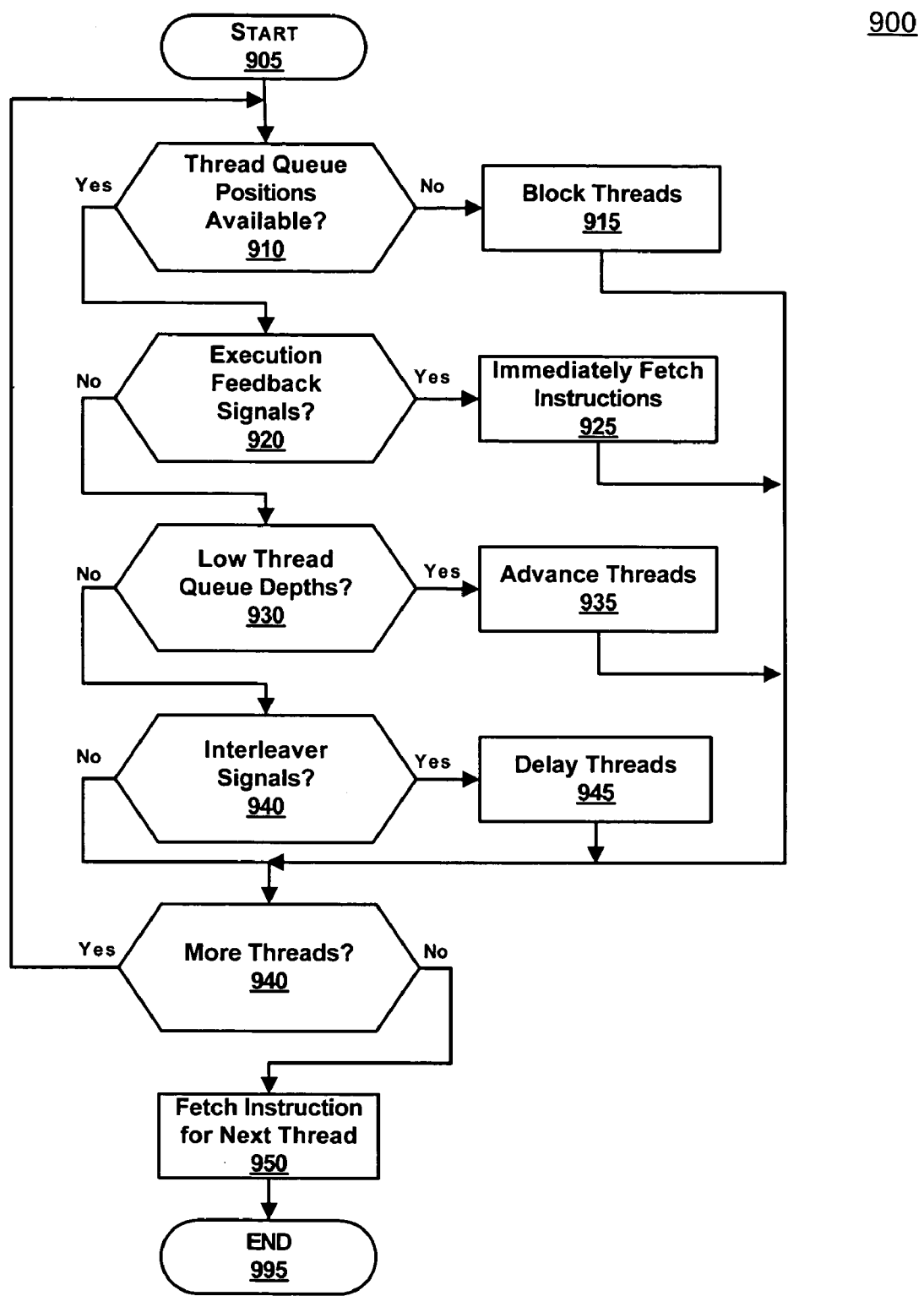
FIG. 9 is a flow chart illustrating a method of generating an instruction fetch sequence according to one embodiment of the present invention.

FIG. 9 is a flow chart illustrating a method 900 of generating an instruction fetch sequence according to one embodiment of the present invention. The fetch control unit 710 can receive a queue signal from the instruction queue 225 indicative of whether there are any instruction storage positions available in the thread queue 825 associated with each individual thread. If there are no thread queue 825 positions available in step 910 for a thread, in the embodiment of FIG. 9, the fetch control unit 710 blocks 915 the thread by not fetching related instructions. Thus, bandwidth is not wasted on fetching instructions that will cause the instruction queue 225 to overflow.

If there are thread queue 825 positions available in step 910, the fetch control unit 710 determines whether there are any execution feedback signals related to individual threads in step 920. If so, such as in the case of a branch misprediction, the fetch control unit 710 immediately fetches instructions for the thread since other instructions associated with the thread have been flushed or invalidated. Otherwise, a delay in fetching instructions could cause a pipeline stall or depletion of instructions for that thread. Beyond steps 910 and 920, less drastic measures are taken responsive to feedback signals.

If there is a low thread queue 825 depth for a thread in step 930, such as less than two instructions, the fetch control unit 710 advances 935 the thread in the instruction fetch sequence. On the other hand, if there is an interleaver signal from the thread interleaver 230 in step 940, such as from a thread that is ineligible for execution, the fetch control unit 710 delays the thread in the instruction fetch sequence.

If there are more threads with state updates, the process repeats at step 950. Otherwise, the fetch control unit 710 fetches 960 the instruction for the next thread. As a default, such as when threads have the same or similar feedback information, the fetch control unit 710 uses round robin to generate the instruction fetch sequence. One of ordinary skill in the art will recognize variations on the feedback inputs in addition to variations on the fetch control unit 710 response to the feedback inputs that are within the scope of the present invention.

FIGS. 10A-B illustrates an example of the instruction fetch sequence as a result of example feedback signals according to one embodiment of the present invention. Referring to table 1020 of FIG. 10A, four columns indicate feedback signals associated with a particular thread, and one column indicates the fetch control unit 710 response to the multiple inputs. In this embodiment, the feedback signals have a value of '1' to indicate a logically TRUE condition and physical high signal, while the feedback signals have a value of '0' to indicate a logically FALSE condition and a physical low, negative or zero signal. As indicated by a bit vector template 1010, the above-described feedback signals are responsive to a thread having no queue position available, a branch misprediction, a low queue depth, or that is ineligible for execution.

At or before a clock cycle associated with time t, the fetch control unit 710 receives a branch misprediction feedback signal (or execution feedback signal) for $T_4$. As a result, the fetch control unit 710 skips over other threads to immediately fetch instructions for this thread and prevent a stall or depletion of instructions. At time t+1, the fetch control unit 710 receives a no queue position available feedback signal (or queue signal) for $T_1$. In this case, the fetch control unit 710 blocks instruction fetching for the thread so that bandwidth is not wasted on instructions that will overflow the instruction queue 225. As a result, $T_1$ is skipped and $T_2$ is selected as the next round robin thread.

At time t+2, the fetch control unit 710 receives a low queue depth signal (or queue signal) for $T_2$. Because the thread queue 825 associated with this thread will soon deplete its instructions, the fetch control unit 710 advances its position in the instruction fetch sequence ahead of $T_3$ and $T_4$, but not $T_1$ (i.e., fetch is advanced, but not immediate) Hence, at t+2, instructions for $T_1$ are fetched, and at t+3, instructions for $T_2$ are fetched. Note that different levels of urgency can be matched to different feedback signals. In the present embodiment, the urgency corresponding to the low queue depth signal is to advance the thread in the instruction fetch sequence rather than immediately fetch instructions as with the branch misprediction feedback signal. This is because the former signal is indicative of a relatively small amount of remaining decoded instructions, while the latter signal is indicative of no remaining decoded instructions since they are all invalidated in response to the branch misprediction. One of ordinary skill in the art will recognize that the level of urgency associated with particular feedback signals is a design choice within the scope of the present invention.

At time t+4, the fetch control unit 710 receives a branch misprediction signal for both $T_3$ and $T_4$. In the event of similar of equal feedback inputs, the fetch control unit 710 resorts to round robin fetching. As applied to the two threads, instructions for $T_3$ are immediately fetched. In the next round robin situation, $T_4$ will be considered first. In the case where there are multiple feedback signal inputs for more than one thread that include more than one condition, in one embodiment, the level of urgency dictates. For example, where an immediate fetch and an advance thread action is required, the fetch control unit 710 performs the immediate fetch. In another embodiment, the fetch control unit 710 performs both the immediate fetch for one thread and the advance thread for another thread. In the case where multiple feedback signals are conflicting, such as an immediate fetch and a block fetch, in one embodiment, the fetch control unit 710 waits until there is no longer a conflict before taking action, and, in another embodiment, the fetch control unit 710 has preprogrammed responses to such conflicts.

FIG. 10B illustrates fetch changes resulting from the inputs of FIG. 10A. The default round robin sequence 1040 continually fetches two instructions per thread. However, the instruction fetch sequence 1050 according to one embodiment of the present invention optimizes upper pipeline 202 bandwidth by fetching instructions that are urgently needed by the lower pipeline 203 for increased processor utilization and to prevent thread stalls.

V. Thread Execution Sequence

Figure 5A:
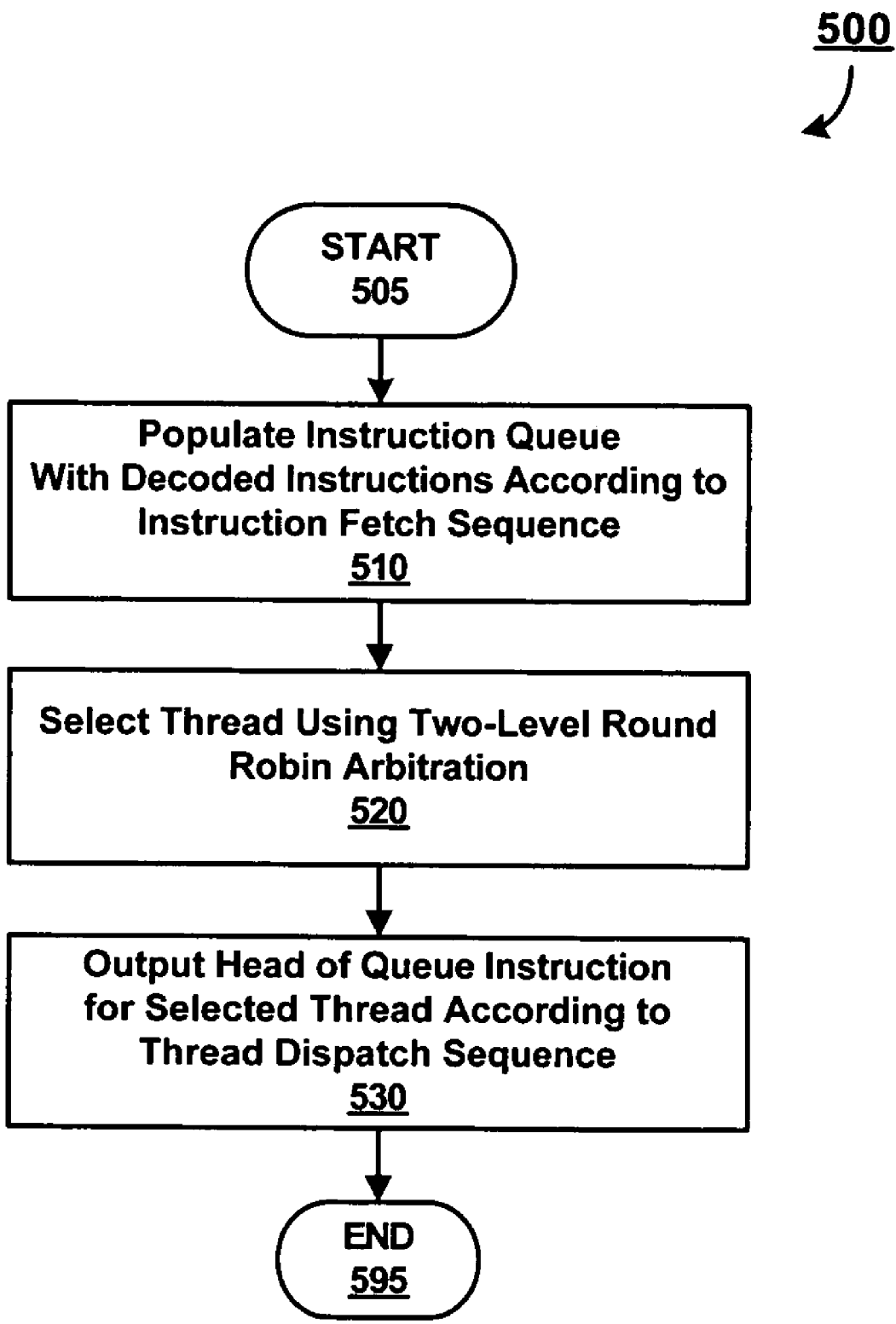
FIG. 5A is a flow chart illustrating a method of thread interleaving in the multithreaded processor according to one embodiment of the present invention.

FIG. 5A is a flow chart illustrating a method 500 of thread interleaving in the multithreaded processor 110 according to one embodiment of the present invention. The decode unit 220 populates 510 the instruction queue 225 with a plurality of decoded instructions from a plurality of threads. Instructions arriving for a thread that already had an instruction in the pool are stacked sequentially behind the previous instructions for the same thread. Individual threads are thus executed in-order.

The selection unit 310 determines 520 a thread execution sequence using two-level round robin arbitration as described in further detail with reference to FIG. 5B. The selection mux 320 outputs 530 a next instruction for the selected thread. Preferably, the next instruction is the head of the instruction queue 225 for the selected thread so that it is executed in-order. In another embodiment, out-of-order execution is implemented on a per-thread basis.

Figure 5B:
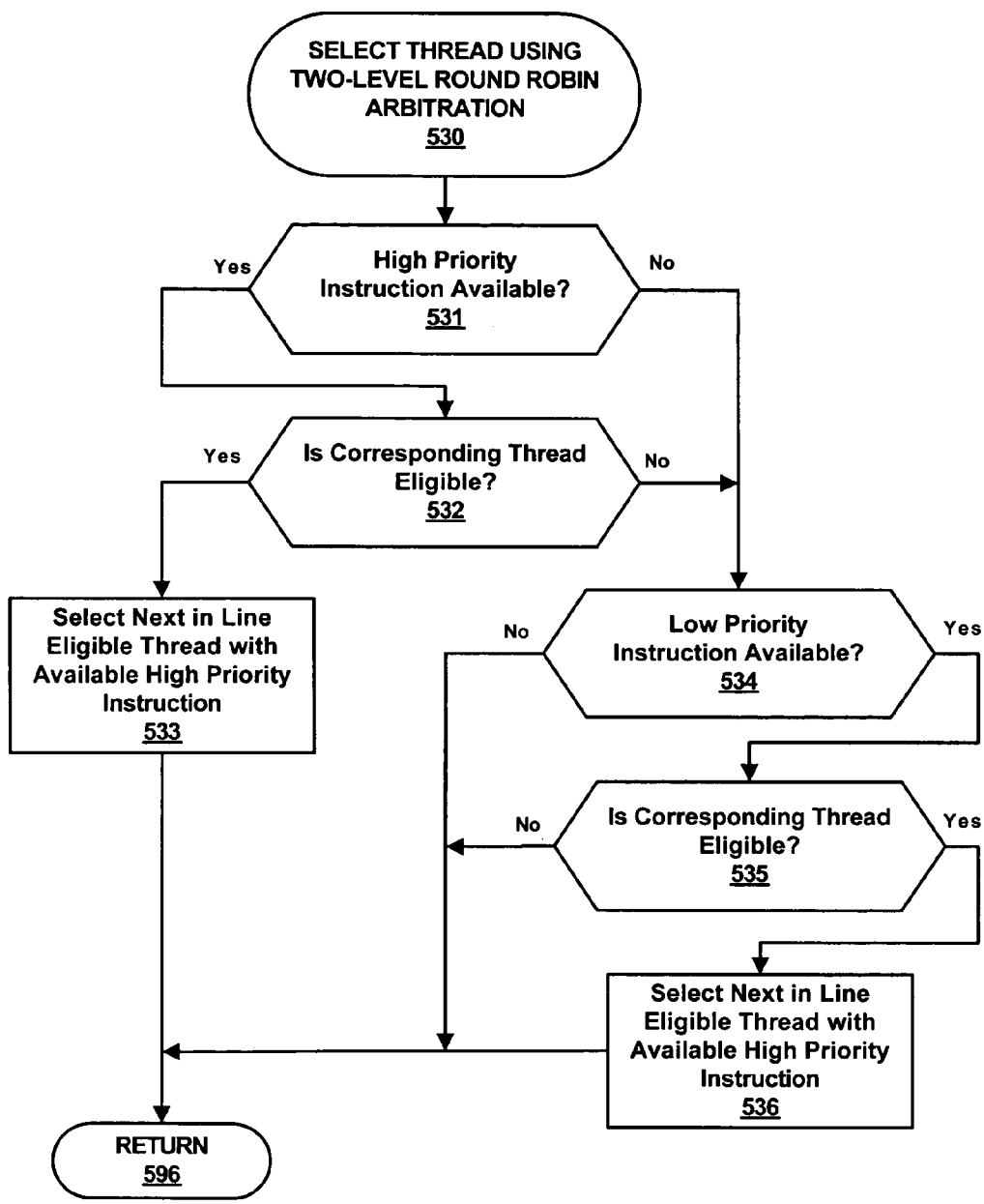
FIG. 5B is a flow chart illustrating the method of selecting an available thread using two-level round robin arbitration according to one embodiment of the present invention.

FIG. 5B is a flow chart illustrating the method of selecting a thread using two-level round robin arbitration according to one embodiment of the present invention. Round robin occurs within the high and low priority units 420, 430 separately, and between eligible threads with available instructions. Accordingly, the thread interleaver 230 determines whether there are one or more high priority instructions available 531. Instructions are available to threads that have a decoded instruction stored in the instruction queue 225. For available high priority instructions, the thread interleaver 230 also determines whether the corresponding threads are eligible for execution 532. Threads are eligible if there are no execution stalls or other thread conditions that would prevent the thread from being executed. Between eligible high priority threads with available instructions, the high priority unit 420 uses round robin arbitration by selecting 533 the next in line thread. If the previously selected thread is $T_1$, thread $T_2$ has an opportunity for dispatch assuming that it is a high priority thread that is eligible and has a corresponding available instruction.

If there are no eligible high priority threads with available instructions, the control mux 440 can select a low priority selection. Similar to the high priority arbitration, the thread interleaver 230 determines whether one or more low priority instructions are available 534 and whether one or more corresponding threads are eligible 535. If so, the low priority unit 430 selects 536 the next in line low priority thread. Otherwise, the process returns 596 without a thread selection. In one embodiment, a present selection can be the same as the immediately previous selection. In another embodiment, the high and low priority selections are made in parallel.

In another embodiment, the control mux 440 overrides the high priority selection. For example, the control mux 440 holds the previous selection if there is a late stall signal or global stall signal. In another example, the control mux 440 prevents thread starvation by selecting the low priority selection after a certain number of consecutive high priority selections. The control mux 440 can also consider a thread age.

Figure 6B:
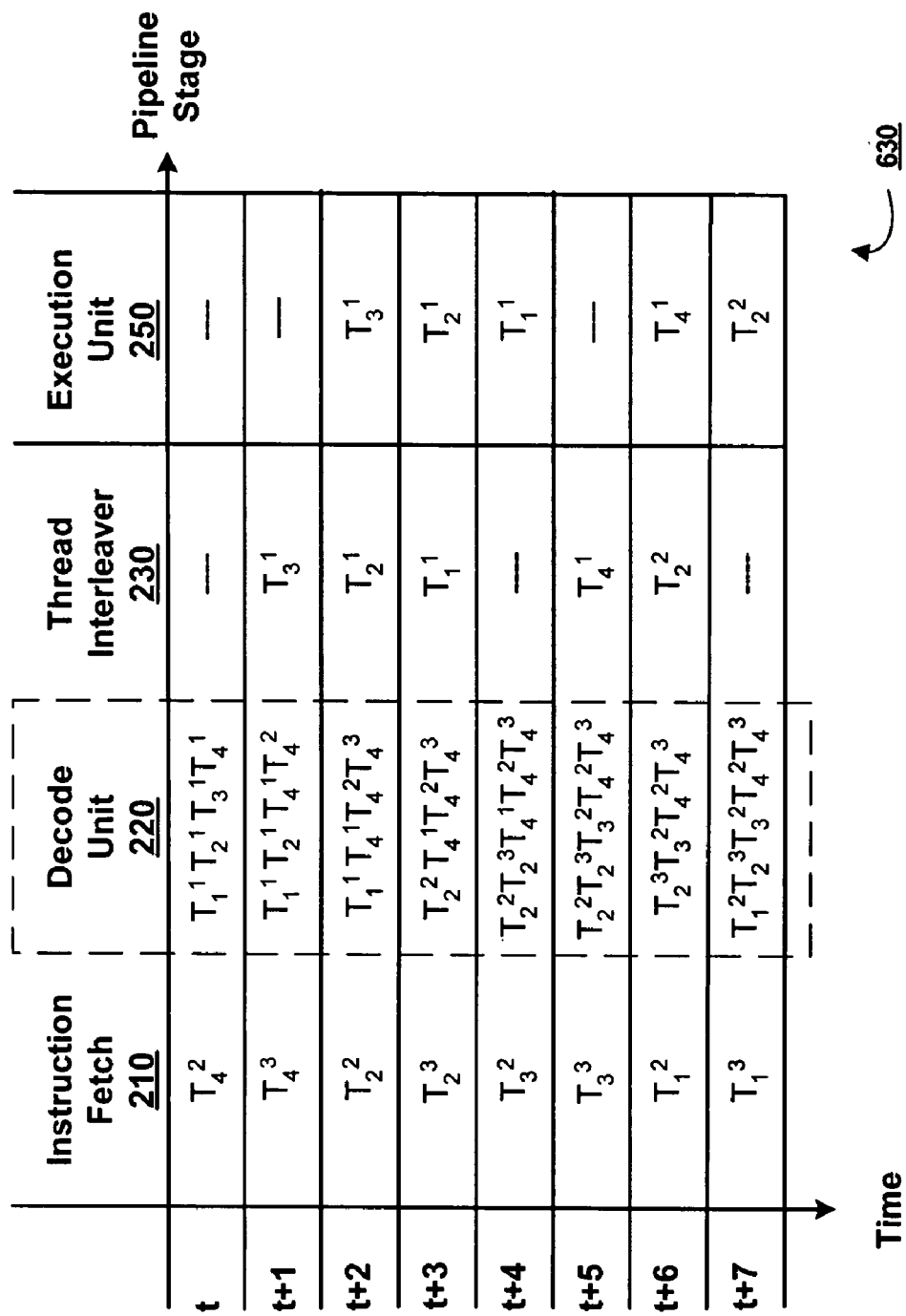
Figure 6C:
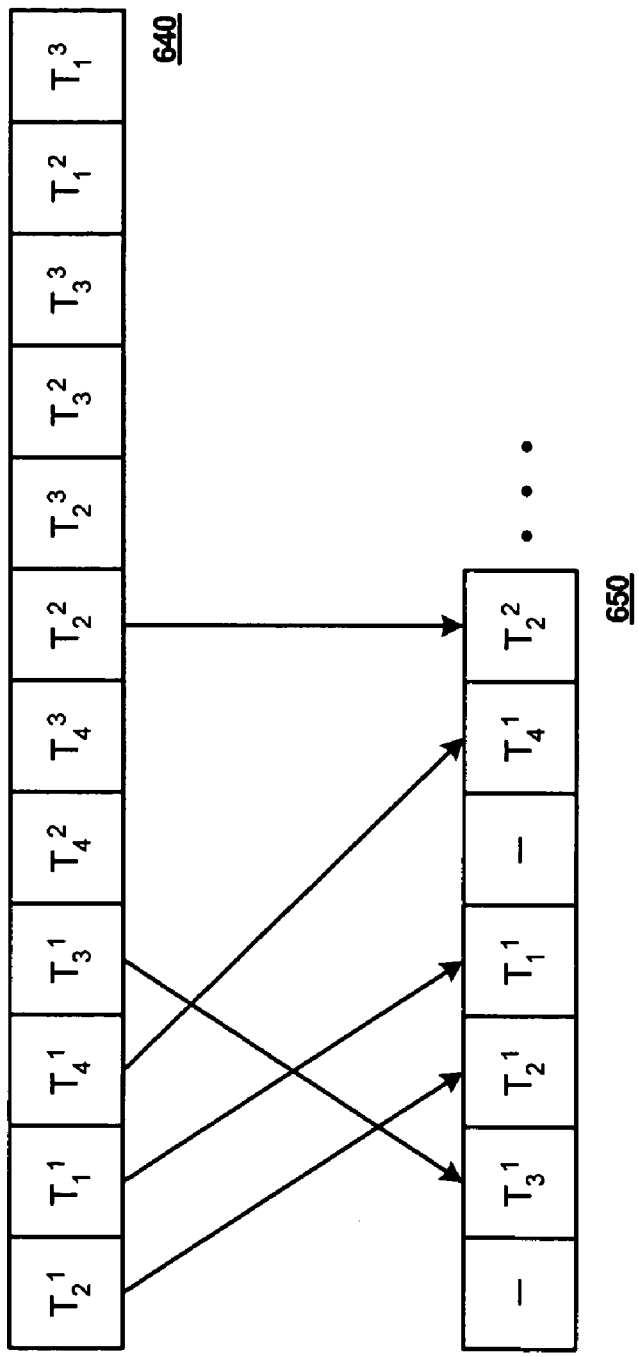

FIGS. 6A-6C illustrate an example of two-level round robin arbitration within the thread interleaver 230 with exemplary thread sequences and exemplary conditions. Additionally, varying and/or alternative arbitrations methods and thread and instruction conditions can be implemented within the scope of the present invention. FIG. 6A is a table displaying the selection unit 310 inputs over successive clock cycles t to (t+6) and FIG. 6B is a table displaying the location of instructions within the multithreaded processor 110, over the same cycles.

In the table 620 of FIG. 6A, each column includes the priority, availability, and eligibility inputs with respect to threads. A bit value of '1' logically indicates a TRUE thread condition and physically indicates a high signal, while a bit value of '0' indicates a FALSE thread condition and a low or negative signal. Descending rows represent successive clock cycles. Each cell thus indicates a bit vector value at a particular time. A bit vector template 610 defines the bit vector as three bits indicating priority, availability, and eligibility from left to right. Turning to a table 630 of FIG. 6B, each column represents sequential pipeline stages 210, 220, 230, 250 and descending rows represent the same successive clock cycles of FIG. 6A. Each cell accordingly represents a location of a $k^{th}$ instruction from one or more threads, $T_m$, during each clock cycle (i.e., $T_m^k$). The decode unit 220 column contains the pool of threads available for arbitration by the thread interleaver 230 at each clock cycle.

In the example at time t, all four threads have an associated instruction in the instruction queue 225 of the decode unit 220. Since $T_3^1$ is the only eligible high priority thread with an available instruction at time t, $T_3^1$ is output from the thread interleaver at time t+1. As shown at t+2 and t+3, $T_3^1$ proceeds through a pipeline stage (i.e., 250) each clock cycle. At time t+1, $T_2^1$, $T_3^1$ and $T_4^1$ are all high priority, but $T_3^1$ does not have an available instruction and $T_4^1$ is not eligible. Consequently, thread interleaver 230 adds $T_2^1$ to the thread execution sequence. If all three threads had the same conditions, round robin would arbitrate to $T_4^1$ since it is the next in line thread after the previous selection of $T_3^1$. At time t+3, since there are no high priority instructions capable of execution, $T^{11}$ a low priority instruction has an opportunity for selection. Of the low priority threads, $T_1^1$ is output as it is the only one with an available instruction.

A global stall occurs at t+3, so no thread is output at t+4 although $T_4^1$ was available and eligible. At t+4, $T_2^2$, another high priority instruction, is now available and eligible and thus would be the selection under normal round robin arbitration. However, the previous selection is held during a global stall, so $T_4^1$ is output by the thread interleaver 230. In another embodiment, another selection is made during a global stall, although the previous selection was not output. At t+5, $T_2^2$ and $T_3^2$ compete under round robin arbitration. Since $T_2^2$ is next in line, it is output at t+6.

FIG. 6C illustrates sequence reordering resulting from the inputs of FIG. 6A in the example pipeline of FIG. 6B. The thread execution sequence 640 in the lower pipeline 203 is resequenced with respect to the instruction fetch sequence 650 in the upper pipeline 202. The sequences are input and output from left to right. In this example, $T_3^1$ and $T_2^2$ moved ahead in the sequence, among other instruction resequencing.

VI. Summary

In summary, the present invention provides a multi-threaded processor 110 with the lower pipeline 202 making fine-grained thread dispatch decisions independent of the upper pipeline 203. An instruction fetching method determines an upper pipeline sequence responsive to an instruction queue depth and other thread conditions on a per thread basis. A thread interleaving method determines a lower pipeline sequence responsive to thread conditions. Advantageously, the present invention increases processor utilization, especially in inherently parallel systems such as network processing devices.

We claim:

1. A network processor, comprising:
   a fetch control unit, having an input coupled to receive an execution feedback signal with stall information related to a plurality of threads on a per thread basis, the fetch control unit generating an instruction fetch sequence based on the execution feedback signal;
   an instruction cache, having an input coupled to an output of the fetch control unit, the instruction cache dispatching instruction data responsive to the instruction fetch sequence; and
   an instruction queue having an output coupled to the fetch control unit input, the instruction queue generating a queue feedback signal responsive to a thread queue condition associated with a thread from the plurality of threads, wherein the fetch control unit generates the instruction fetch sequence also based on the queue feedback signal.

2. The network processor of claim 1, wherein the thread queue condition indicates that a thread queue has less than a first amount of remaining storage.

3. The network processor of claim 2, wherein the fetch control unit blocks the thread from the instruction fetch sequence responsive to the queue feedback signal.

4. The network processor of claim 1, wherein the thread queue condition indicates that a thread queue has less than a second amount of remaining decoded instructions.

5. The network processor of claim 4, wherein the fetch control unit advances the thread in the instruction fetch sequence responsive to the queue feedback signal.

6. The network processor of claim 1, further comprising a thread interleaver having an output coupled to the fetch control unit input, the thread interleaver generating an interleaver feedback signal responsive to a thread condition, wherein the fetch control unit generates the instruction fetch sequence also based on the interleaver feedback signal.

7. The network processor of claim 6, wherein the thread condition indicates that a thread from the plurality of threads is ineligible for execution.

8. The network processor of claim 1, further comprising an execution pipeline having an output coupled to the fetch control unit input, the execution pipeline generating the execution feedback signal responsive to an execution stall.

9. The network processor of claim 8, wherein the fetch control unit delays the thread in the instruction fetch sequence responsive to the execution stall.

10. The network processor of claim 8, wherein the execution stall comprises one from the group consisting of a misprediction, an exception, a data cache miss, an external resource stall, an interlock, and a memory operation ordering.

11. The network processor of claim 1, wherein the fetch control unit generates the instruction fetch sequence, in a default state, by selecting a thread from the plurality of threads according to round robin arbitration.

12. The network processor of claim 1, wherein the execution feedback signal is capable of including stall information related to each of the plurality of threads.

13. The network processor of claim 1, wherein the instruction data are packet processing instructions related to at least one form the group consisting of: packet routing, switching, bridging and forwarding.

14. A network processor, comprising:
    a fetch control unit, having an input coupled to receive an execution feedback signal with stall information related to a plurality of threads on a per thread basis, the fetch control unit generating an instruction fetch sequence based on the execution feedback signal;
    an instruction cache having an input coupled to an output of the fetch control unit, the instruction cache dispatching instruction data responsive to the instruction fetch sequence; and
    a thread interleaver having an output coupled to the fetch control unit input, the thread interleaver generating an interleaver feedback signal responsive to a thread condition, wherein the fetch control unit generates the instruction fetch sequence also based on the interleaver feedback signal, and wherein the thread interleaver generates a thread execution sequence independent of the instruction fetch sequence.

15. A network processor comprising:
    means for fetching, having an input coupled to receive an execution feedback signal with stall information related to a plurality of threads on a per thread basis, the means for fetching generating an instruction fetch sequence based on the execution feedback signal;
    means for storing, having an input coupled to an output of the means for fetching, the means for storing dispatching instruction data responsive to the instruction fetch sequence; and
    a means for queuing having an output coupled to the means for fetching input, the means for queuing generating a queue feedback signal responsive to a thread queue condition associated with a thread from the plurality of threads, wherein the means for fetching generates the instruction fetch sequence also based on the queue feedback signal.

16. The network processor of claim 15, wherein the thread queue condition indicates that a means for thread queuing has less than a first amount of remaining storage.

17. The network processor of claim 16, wherein the means for fetching blocks the thread from the instruction fetch sequence responsive to the queue feedback signal.

18. The network processor of claim 15, wherein the thread queue condition indicates that a means for thread queuing has less than a second amount of remaining decoded instructions.

19. The network processor of claim 18, wherein the means for fetching advances the thread in the instruction fetch sequence responsive to the queue feedback signal.

20. The network processor of claim 15, further comprising a means for interleaving having an output coupled to the means for fetching input, the means for interleaving generating an interleaver feedback signal responsive to a thread condition, wherein the means for fetching generates the instruction fetch sequence also based on the interleaver feedback signal.

21. The network processor of claim 20, wherein the thread condition indicates that a thread from the plurality of threads is ineligible for execution.

22. The network processor of claim 15, further comprising an means for executing having an output coupled to the means for fetching input, the means for executing generating the execution feedback signal responsive to an execution stall.

23. The network processor of claim 22, wherein the means for fetching delays the thread in the instruction fetch sequence responsive to the execution stall.

24. The network processor of claim 22, wherein the execution stall comprises one from the group consisting of a data cache miss, an external resource stall, an interlock, and a memory operation ordering.

25. The network processor of claim 15, wherein the means for fetching generates the instruction fetch sequence, in a default state, by selecting a thread from the plurality of threads according to round robin arbitration.

26. The network processor of claim 15, wherein the execution feedback signal is capable of including stall information related to each of the plurality of threads.

27. The network processor of claim 15, wherein the instruction data are packet processing instructions related to at least one form the group consisting of: packet routing, switching, bridging and forwarding.

28. A network processor, comprising:
means for fetching, having an input coupled to receive an execution feedback signal with stall information related to a plurality of threads on a per thread basis, the means for fetching generating an instruction fetch sequence based on the execution feedback signal;
means for storing, having an input coupled to an output of the means for fetching, the means for storing dispatching instruction data responsive to the instruction fetch sequence; and
a means for interleaving having an output coupled to the means for fetching input, the means for interleaving generating an interleaver feedback signal responsive to a thread condition, wherein the means for fetching generates the instruction fetch sequence also based on the interleaver feedback signal, and wherein the means for interleaving generates a thread execution sequence independent of the instruction fetch sequence.

29. A method for fetching instructions in a network processor, comprising:
generating a queue feedback signal responsive to a thread queue condition associated with a thread from the plurality of threads, wherein the thread queue condition indicates that a thread queue has less than a first amount of remaining storage;
generating an instruction fetch sequence based on an execution feedback signal with stall information related to a plurality of threads on a per thread basis, comprising:
blocking the thread from the instruction fetch sequence responsive to the queue feedback signal; and
dispatching instruction data responsive to the instruction fetch sequence.

30. The method of claim 29, wherein the thread queue condition indicates that a thread queue has less than a second amount of remaining decoded instructions.

31. A method for fetching instructions in a network processor, comprising:
generating a queue feedback signal responsive to a thread queue condition associated with a thread from the plurality of threads, wherein the thread queue condition indicates that a thread queue has less than a second amount of remaining decoded instructions;
generating an instruction fetch sequence based on an execution feedback signal with stall information related to a plurality of threads on a per thread basis, comprising:
advancing the thread in the instruction fetch sequence responsive to the queue feedback signal;
dispatching instruction data responsive to the instruction fetch sequence.

32. The method of claim 31, wherein the generating the instruction fetch sequence further comprises generating an interleaver feedback signal responsive to a thread condition in a thread interleaver.

33. The method of claim 32, wherein the thread condition indicates that a thread from the plurality of threads is ineligible for execution.

34. A method for fetching instructions in a network processor, comprising:
generating an instruction fetch sequence based on an execution feedback signal with stall information related to a plurality of threads on a per thread basis, comprising:
generating an interleaver feedback signal responsive to a thread condition in a thread interleaver, comprising:
generating a thread execution sequence independent of the instruction fetch sequence; and
dispatching instruction data responsive to the instruction fetch sequence.

35. The method of claim 34, the generating the instruction fetch sequence further comprises generating the execution feedback signal responsive to an execution stall.

36. The method of claim 35, wherein the generating the instruction fetch sequence further comprises delaying the thread in the instruction fetch sequence responsive to the execution stall.

37. The method of claim 35, wherein the execution stall comprises one from the group consisting of a data cache miss, an external resource stall, an interlock, and a memory operation ordering.

38. The method of claim 34, wherein the generating the instruction fetch sequence comprises generating the instruction fetch sequence, in a default state, by selecting a thread from the plurality of threads according to round robin arbitration.

39. The method of claim 34, wherein the feedback signal is capable of including stall information related to each of the plurality of threads.

40. The method of claim 34, wherein the instruction data are packet processing instructions related to at least one form the group consisting of:
packet routing, switching, bridging and forwarding.

* * * * *